United States Patent Office 3,200,160
Patented Aug. 10, 1965

---

3,200,160
PRODUCTION OF VINYL FLUORIDE
Dario Sianesi and Giuseppe Nelli, Milan, Italy, assignors to Montecatini Società Generale per l'Industria Mineraria e Chimica, Milan, Italy
No Drawing. Filed June 10, 1963, Ser. No. 286,524
Claims priority, application Italy, June 13, 1962, 12,013/62
6 Claims. (Cl. 260—653.5)

The present invention relates to a novel process for producing vinyl fluoride.

It is known that vinyl flouride, when polymerized, provides plastic materials having very valuable and useful properties. (See, e.g., V. L. Simril and B. A. Curry, J. Appl. Polymer Sci., IV, 62–68, 1960.) Processes are known for the production of vinyl fluoride by the addition of hydrofluoric acid to acetylene in the presence of suitable types of catalysts.

Analogous processes for the production of other vinyl halides, as e.g., vinyl chloride, are readily and conveniently realizable. However, the production of vinyl fluoride by the addition of a hydroflouric acid molecule to acetylene involves many disadvantages. Thus, this reaction causes the formation of a mixture of vinyl fluoride and asymmetrical difluoroethane which contaminates the final product along with unreacted acetylene. The difluoroethane is often present in predominant proportions and therefore the difluoroethane must be separated and submitted to dehydrofluorination in order to recover vinyl fluoride.

In addition, both the yield and the composition of the products obtained by the reaction between acetylene and hydrofluoric acid are directly related to the activity of the catalyst. Since the catalyst is normally altered during the course of the reaction, rapidly inactivating itself, appreciable variations, both in the yield and in the composition of the final product are observed.

Finally, the vinyl fluoride obtained by these processes is always accompanied by acetylene. Separation and purification of the vinyl fluoride is particularly difficult and laborious because of the proximity of the boiling temperatures of acetylene and vinyl fluoride, and because of the necessity of obtaining, for the polymerization, a vinyl fluoride which is virtually free from acetylene.

Another method which would be most convenient for the production of vinyl fluoride comprises dehydrochlorinating 1-chloro-1-fluoroethane. This compound (1-chloro-1-fluoroethane) can be easily obtained, either by partially fluorinating dichloroethane or by adding a hydrofluoric acid molecule to vinyl chloride.

Heretofore, the pyrolytic dehydrochlorination of 1-chloro-1-fluoroethane at atmospheric pressure was not a very convenient process in actual practice. Thus, the reaction is accompanied by considerable cracking phenomena with the formation of carbonaceous products and frequently a clogging of the reaction tubes.

Further, according to German Patent 859,887, the specificity of the dehydrohalogenation reaction is not high. and the reaction product contains, in practice, one part of vinyl chloride (formed by eliminaton of hydrofluoric acid from chlorofluoroethane) for every four parts of vinyl fluoride.

Clearly, the foregoing disadvantages drastically limit the practical utilizaton of the process for producng vinyl fluoride by dehydrochlorination of chlorofluoroethane.

We have now surprisingly found that it is possible to carry out the thermal dehydrochlorination of 1-chloro-1-fluoroethane in such a manner as to obtain a high conversion to vinyl fluoride without appreciable formation of undesired by-products (such as, e.g., of vinyl chloride) and virtually in the absence of carbonization phenomena. These results are achieved by effecting the dehydrochlorination at reduced pressures.

In accordance with one aspect of our invention, there is provided a process for producing vinyl fluoride, this process comprising pyrolizing 1-chloro-1-fluoroethane to thereby effect dehydrochlorination thereof, this pyrolytic dehydrochlorination being carried out under a partial pressure of 1-chloro-1-fluoroethane of from about 5 to 500 mm. Hg at a temperature of from about 500 to 800° C. More preferred reaction conditions are at a partial pressure of from about 50 to 400 mm. Hg and at a temperature of from about 600 to 750° C.

At the foregoing temperatures, the dehydrochlorination reaction proceeds at a satisfactory rate. Another embodiment of our invention comprises diluting 1-chloro-1-fluoroethane with an inert gas, e.g., nitrogen, carbon dioxide, or the like, whereby the partial pressure of the chlorofluoroethane is maintained at from about 5 to 500 mm. Hg, and more preferably from about 50 to 400 mm. Hg. Under these conditions, the reaction to eliminate a hydrochloric acid molecule from the fluorochloroethane molecule proceeds at a considerable rate, so that with contact times (or "residence times") of the order of a second, conversions in excess of 50% are obtained.

The contact time normally used according to the present invention is from about 0.1 to 10 seconds, and preferably is from about 0.2 to 4 seconds.

By following the foregoing teachings, according to the present invention, a notable specificity of the dehydrohalogenation is ascertainable, namely, the elimination of a hydrochloric acid molecule from 1-chloro-1-fluoroethane is much favored as compared to the concurrent elimination of a hydrofluoric acid molecule. Thus, in the reaction products, vinyl chloride is normally present in proportions which are not in excess of 5% by volume of the vinyl fluoride present.

Even when the method of our invention is carried out for a long time, neither carbonization phenomena of the reagent nor of the products are observed, nor is any other pyrolytic by-product reaction detected. Moreover, the yield of our process, in terms of vinyl fluoride, is quite high, i.e., generally greater than 90%.

The dehydrochlorination of 1-chloro-1-fluoroethane at reduced pressure will proceed satisfactorily in the absence of cataylsts, however heat must of course be supplied, i.e., a temperature of from about 500 to 800° C.

The process is preferably carried out in a continuous manner, by passing chlorofluoroethane in the gaseous state, either under reduced pressure or diluted with an inert gas, through a tubular reactor kept at an effective pyrolysis temperature. The reactor must be made of inert material which is resistant to corrosion at the operating temperatures, and also resistant to the reactant and the reaction products. (The reactor need not necessarily be made entirely of inert material, but the inside thereof should be lined with inert material.)

The reaction tube is preferably empty, but if its interior dimensions become unduly large, the tube may be filled with an inert material in order to obtain a better transmission and distribution of the heat to the gases passing therethrough. Suitable inert materials include the noble metals, carbon, copper and nickel alloys, stainless steel, etc.

The heating of the reaction zone may conveniently be effected by means of electric heating elements which surround the tubular reactor. The reaction temperature is checked by means of thermocouples disposed inside and outside the reaction tube.

The gases leaving the reaction zone are preferably treated with basic agents which are either solid or in solution, to thereby remove the hydrochloric acid contained in such gases. If necessary water is then removed from the gases. The gases are then collected as desired, i.e., in the gaseous state or else condensed and collected. Vinyl fluoride (boiling point −72.2° C.) is easily separated from chlorofluoroethane (boiling point −16.5° C.). If present, any minute amount of vinyl chloride contained therein is separated by distillation or fractional condensation.

The following examples will further illustrate our invention. In these examples, "Conversion %" indicates the amount (on a molar basis) of vinyl fluoride obtained with respect to the chlorofluoroethane charged to the reaction tube; "Yield" indicates the quantity (on a molar basis) of vinyl fluoride obtained with respect to the chlorofluoroethane consumed in the reaction.

EXAMPLES 1–22

A reaction, vacuum-tight apparatus is used. This apparatus includes the following: An extended glass receiver with a capacity of 500 cm.³, graduated at 1 cm.³ intervals, constitutes the tank containing 1-chloro-1-fluoroethane to be charged to the reaction. The receiver is kept closed at the upper part in order to avoid evaporation of the liquid. At the lower part the receiver is connected to a pin valve which regulates the rate of introduction of the reagent into the reactor which is kept in a horizontal position.

The reactor is a stainless steel tube (inside diameter=15 mm., outside diameter=19 mm., length=1100 mm.), heated for a length of 640 mm. by means of a tubular electric thermo-regulated furnace. A thermocouple with a sheath in stainless steel is put inside the tube, with a sensitive element in contact with the middle of the heated zone.

At the exit of the reactor the gases bubble into a 20% NaOH solution and pass therefrom into two absorption towers, filled respectively with solid NaOH and Drierite. The gases, passing through a Cartesian Manostate which serves for the regulation and maintaining constant the pressure in the reaction zone, are drawn by a mechanical oil pump and returned to atmospheric pressure by the pump itself. Two mercury manometers which are connected to the entrance and exit of the pyrolysis tube, indicate the pressure in the reaction zone.

At the exit of the pump the gases pass through a trap cooled at −20° C. which condenses the bulk of the unreacted chlorofluoroethane. Thereafter, the gases are sent to a gasometer where they are collected, measured and analyzed.

With this apparatus several runs are made, varying independently the temperature, pressure, and contact time. Each run takes 5 hours. The results are tabulated in Table 1.

After each test only a very small amount of carbonaceous products in the reaction tube are determined. The amount of vinyl fluoride in the reaction product normally exceeds 95%. Accordingly, the difference from 100% of the yield is due to mechanical losses of chlorofluoroethane and vinyl fluoride. Only in the product of Example 20 was it possible to detect a very small quantity of acetylene (less than 1%).

Table 1

| Example No. | Temperature (° C.) | Pressure (mm. Hg) | Contact Time (sec.) | Conversion (Percent) | Yield (Percent) |
|---|---|---|---|---|---|
| 1 | 600 | 60 | 1.25 | 47.5 | 93 |
| 2 | 600 | 60 | 0.55 | 25.2 | 92 |
| 3 | 600 | 60 | 0.30 | 16.7 | 97 |
| 4 | 600 | 120 | 2.30 | 78.0 | 91 |
| 5 | 600 | 120 | 1.25 | 44.2 | 93 |
| 6 | 600 | 120 | 0.55 | 36.4 | 93 |
| 7 | 600 | 180 | 1.70 | 58.8 | 92 |
| 8 | 650 | 60 | 1.20 | 90.2 | 93 |
| 9 | 650 | 60 | 0.55 | 58.3 | 97 |
| 10 | 650 | 60 | 0.30 | 48.8 | 96 |
| 11 | 650 | 120 | 3.30 | 87.5 | 95 |
| 12 | 650 | 120 | 1.10 | 85.0 | 95 |
| 13 | 650 | 120 | 0.55 | 67.0 | 97 |
| 14 | 650 | 180 | 1.65 | 91.0 | 93 |
| 15 | 650 | 180 | 0.85 | 77.0 | 97 |
| 16 | 650 | 240 | 2.15 | 84.0 | 94 |
| 17 | 650 | 240 | 1.15 | 64.5 | 94 |
| 18 | 650 | 300 | 1.0 | 61.6 | 96 |
| 19 | 700 | 120 | 0.55 | 79.0 | 91 |
| 20 | 750 | 120 | 0.50 | 93.6 | 89 |
| 21 | 500 | 120 | 1.25 | 2.0 | 95 |
| 22 | 550 | 120 | 1.10 | 12.0 | 95 |

As a comparison with the foregoing examples, using the same apparatus, but operating at atmospheric pressure, with the (partial) pressure of 1-chloro-1-fluoroethylene being equal to 760 mm. Hg (i.e., atmospheric), the contact time being about one second, and the temperature being from 500 to 700° C., the gases initially obtained by pyrolysis showed a vinyl chloride content of from 27 to 52%. Moreover, after a short time the reactions had to be stopped because of occlusions and deposits in the reaction tube due to the formation of carbonaceous materials.

Variations can, of course, be made without departing from the spirit of our invention.

Having thus described the invention, what is desired to be secured and claimed by Letters Patent is:

1. A method for the production of vinyl fluoride comprising pyrolytically dehydrochlorinating 1-chloro-1-fluoroethane in the gaseous state under a partial pressure of 1-chloro-1-fluoroethane of from about 5 to 500 mm. Hg.

2. The method of claim 1 wherein the dehydrochlorination is carried out at a temperature of from about 500 to 800° C.

3. The method of claim 2 wherein the dehydrochlorination is carried out at a temperature of from about 600 to 750° C.

4. The method of claim 2 wherein the residence time is from about 0.1 to 10 seconds.

5. The method of claim 4 wherein the residence time is from about 0.2 to 4 seconds.

6. The method of claim 1 wherein the partial pressure of 1-chloro-1-fluoroethane in the reaction medium is obtained at atmospheric pressure by introducing, along with 1-chloro-1-fluoroethane, an inert gas.

References Cited by the Examiner

FOREIGN PATENTS 859,887  12/52  Germany.

LEON ZITVER, *Primary Examiner.*

DANIEL D. HORWITZ, *Examiner.*